United States Patent
Yee et al.

(10) Patent No.: US 10,150,452 B2
(45) Date of Patent: Dec. 11, 2018

(54) WINDSCREEN WIPER DEVICE

(71) Applicant: Federal-Mogul Motorparts LLC, Southfiled, MI (US)

(72) Inventors: Jesus Yee, El Paso, TX (US); Dennis E. Cox, Belleville, MI (US)

( * ) Notice: Subject to any disclaimer, the term of this patent is extended or adjusted under 35 U.S.C. 154(b) by 0 days.

(21) Appl. No.: 15/782,949

(22) Filed: Oct. 13, 2017

(65) Prior Publication Data

US 2018/0105144 A1    Apr. 19, 2018

Related U.S. Application Data

(60) Provisional application No. 62/408,349, filed on Oct. 14, 2016.

(51) Int. Cl.
*B60S 1/40* (2006.01)
*B60S 1/38* (2006.01)

(52) U.S. Cl.
CPC .............. *B60S 1/4048* (2013.01); *B60S 1/38* (2013.01); *B60S 1/4045* (2013.01); *B60S 1/4064* (2013.01); *B60S 1/3849* (2013.01); *B60S 2001/4051* (2013.01); *B60S 2001/4054* (2013.01)

(58) Field of Classification Search
CPC ........ B60S 1/40; B60S 1/4045; B60S 1/4048; B60S 2001/4051; B60S 2001/4054; B60S 1/4003; B60S 1/4038
USPC ...................................... 15/250.32
See application file for complete search history.

(56) References Cited

U.S. PATENT DOCUMENTS

| | | |
|---|---|---|
| 8,327,499 B2 | 12/2012 | Boland |
| 8,826,485 B2 | 9/2014 | Boland |
| 8,997,304 B2 | 4/2015 | Oslizlo et al. |
| 9,180,839 B2 | 11/2015 | Oslizlo et al. |
| 9,199,612 B2 | 12/2015 | Boland |
| 9,452,737 B2 | 9/2016 | Bratec et al. |
| 2006/0059647 A1* | 3/2006 | Ostrowski ............. B60S 1/3868 15/250.32 |
| 2006/0064842 A1* | 3/2006 | Verelst ..................... B60S 1/38 15/256.5 |
| 2007/0113367 A1* | 5/2007 | Boland ................... B60S 1/381 15/250.201 |

(Continued)

FOREIGN PATENT DOCUMENTS

| | | |
|---|---|---|
| DE | 10347637 A1 | 5/2005 |
| DE | 102014226523 A1 | 6/2016 |
| WO | 2015160189 A1 | 10/2015 |

OTHER PUBLICATIONS

Machine translation of description portion of DE 102014226523, published Jun. 2016.*

(Continued)

*Primary Examiner* — Gary Graham
(74) *Attorney, Agent, or Firm* — Robert L. Stearns; Dickinson Wright, PLLC

(57) ABSTRACT

The windscreen wiper device includes a wiper blade that is made of an elastomeric material and extends in a longitudinal direction. The windscreen wiper device also includes a joint part with a U-shaped cross-section that includes a top wall and a pair of side walls. At least one of the side walls has a spring loaded interference finger which projects outwardly for engaging an inner surface of a wiper arm to reduce side to side play between the joint part and the wiper arm.

13 Claims, 6 Drawing Sheets

(56) References Cited

U.S. PATENT DOCUMENTS

| | | | |
|---|---|---|---|
| 2008/0134455 A1* | 6/2008 | Kinnaert | B60S 1/3867 |
| | | | 15/250.32 |
| 2010/0000041 A1 | 1/2010 | Boland | |
| 2010/0212101 A1* | 8/2010 | Thienard | B60S 1/3868 |
| | | | 15/250.32 |
| 2012/0110772 A1 | 5/2012 | Boland | |
| 2013/0174369 A1 | 7/2013 | Boland | |
| 2013/0255026 A1 | 10/2013 | Depondt | |
| 2014/0026350 A1 | 1/2014 | Boland | |
| 2014/0259507 A1 | 9/2014 | Caillot et al. | |
| 2014/0317877 A1 | 10/2014 | Boland | |
| 2014/0338143 A1 | 11/2014 | Bousset et al. | |
| 2015/0197217 A1 | 7/2015 | Avsar | |
| 2015/0210251 A1 | 7/2015 | Oslizlo et al. | |
| 2015/0329087 A1 | 11/2015 | Young, III et al. | |
| 2016/0001746 A1 | 1/2016 | Scholl et al. | |
| 2016/0016553 A1 | 1/2016 | Schaeuble | |
| 2016/0016554 A1 | 1/2016 | Depondt | |
| 2016/0107615 A1 | 4/2016 | Young, III et al. | |
| 2016/0107616 A1 | 4/2016 | Young, III et al. | |
| 2016/0207501 A1* | 7/2016 | Avasiloaie | B60S 1/387 |
| 2017/0015281 A1* | 1/2017 | Mouleyre | B60S 1/381 |

OTHER PUBLICATIONS

International Search Report, dated Jan. 8, 2018 (PCT/US2017/056688).

* cited by examiner

WINDSCREEN WIPER DEVICE

CROSS-REFERENCE TO RELATED APPLICATION

This application claims the benefit of U.S. Provisional Patent Application Ser. No. 62/408,349, filed Oct. 14, 2016, entitled "Windscreen Wiper Device", the entire disclosure of the application being considered part of the disclosure of this application and hereby incorporated by reference.

BACKGROUND OF THE INVENTION

1. Field of the Invention

The present invention is related, generally, to windscreen wiper devices and, more particularly, to the connecting devices of windscreen wiper devices.

2. Related Art

Passenger vehicles are manufactured with a range of different styles of oscillating wiper arms including, for example, various sizes of pin-style wiper arms, bayonet-style wiper arms and top lock-style wiper arms. These oscillating arms are of such different shapes and configurations that they must be secured with windscreen wiper devices in very different manners. This leads to increased design costs since a windscreen wiper device manufacturer must design and test differently configured connecting devices for attachment with the various shapes and sizes of oscillating arm and increased manufacturing costs because different components must be manufactured to attach the same type of wiper blade with the oscillating wiper arms of different vehicles.

SUMMARY OF THE INVENTION AND ADVANTAGES

One aspect of the present invention is related to a windscreen wiper device which includes a wiper blade that is made of an elastomeric material and extends in a longitudinal direction. The windscreen wiper device also includes a joint part with a U-shaped cross-section that includes a top wall and a pair of side walls. At least one of the side walls has a spring loaded interference finger which projects outwardly for engaging an inner surface of a wiper arm to reduce side to side play between the joint part and the wiper arm.

The spring loaded interference finger allow for a tighter, more secure connection between the joint part and a wiper arm, thereby reducing rattling and impacting between these components.

According to another aspect of the present invention, the at least one spring loaded finger has a longitudinally facing ramped surface for automatically deflecting the spring loaded finger as the joint part is attached with a wiper arm.

According to yet another aspect of the present invention, each of the side walls has at least one spring loaded interference finger.

According to still another aspect of the present invention, each of the side walls has a pair of spring loaded interference fingers.

According to a further aspect of the present invention, the spring loaded interference fingers on each side wall extend in opposite longitudinal directions.

According to yet a further aspect of the present invention, each spring loaded interference finger has a U-shaped projection.

According to still a further aspect of the present invention, each generally U-shaped projection has a pair of legs with ramped surfaces for automatically deflecting said spring loaded finger as said joint part is attached with a wiper arm.

According to another aspect of the present invention, each of the spring loaded interference fingers is surrounded by a U-shaped opening in an associated one of said side walls and has a flat surface that is recessed relative to surrounding portions of said side wall.

According to yet another aspect of the present invention, the joint part includes a front nose portion and a main body portion, and the front nose portion has a greater width and a greater height than the main body portion to present a U-shaped ledge that faces rearwardly.

According to still another aspect of the present invention, the top wall of the main body portion has at least one spring loaded tongue for engaging in an opening in a wiper arm.

According to a further aspect of the present invention, the top wall of the main body portion has a pair of spring loaded tongues for engaging in the openings of different types of wiper arms.

According to yet a further aspect of the present invention, the spring loaded tongues in the top wall of the main body portion extend in opposite longitudinal directions.

According to still a further aspect of the present invention, at least one of the side walls of the main body portion has a groove which opens to a longitudinal end of the main body portion.

According to another aspect of the present invention, wherein the wiper blade is biased into a curved shape when in a resting condition.

According to yet another aspect of the present invention, the windscreen wiper device further includes a base which has a pair of laterally outwardly extending protrusions, and the side walls of the joint part have circular openings for allowing the joint part to pivot relative to the base about a pivot axis.

BRIEF DESCRIPTION OF THE DRAWINGS

These and other aspects, features and advantages of the present invention will become more readily appreciated when considered in connection with the following detailed description of the presently preferred embodiment and best mode, appended claims and accompanying drawings, in which:

DESCRIPTION OF THE ENABLING EMBODIMENT

Figure 1:
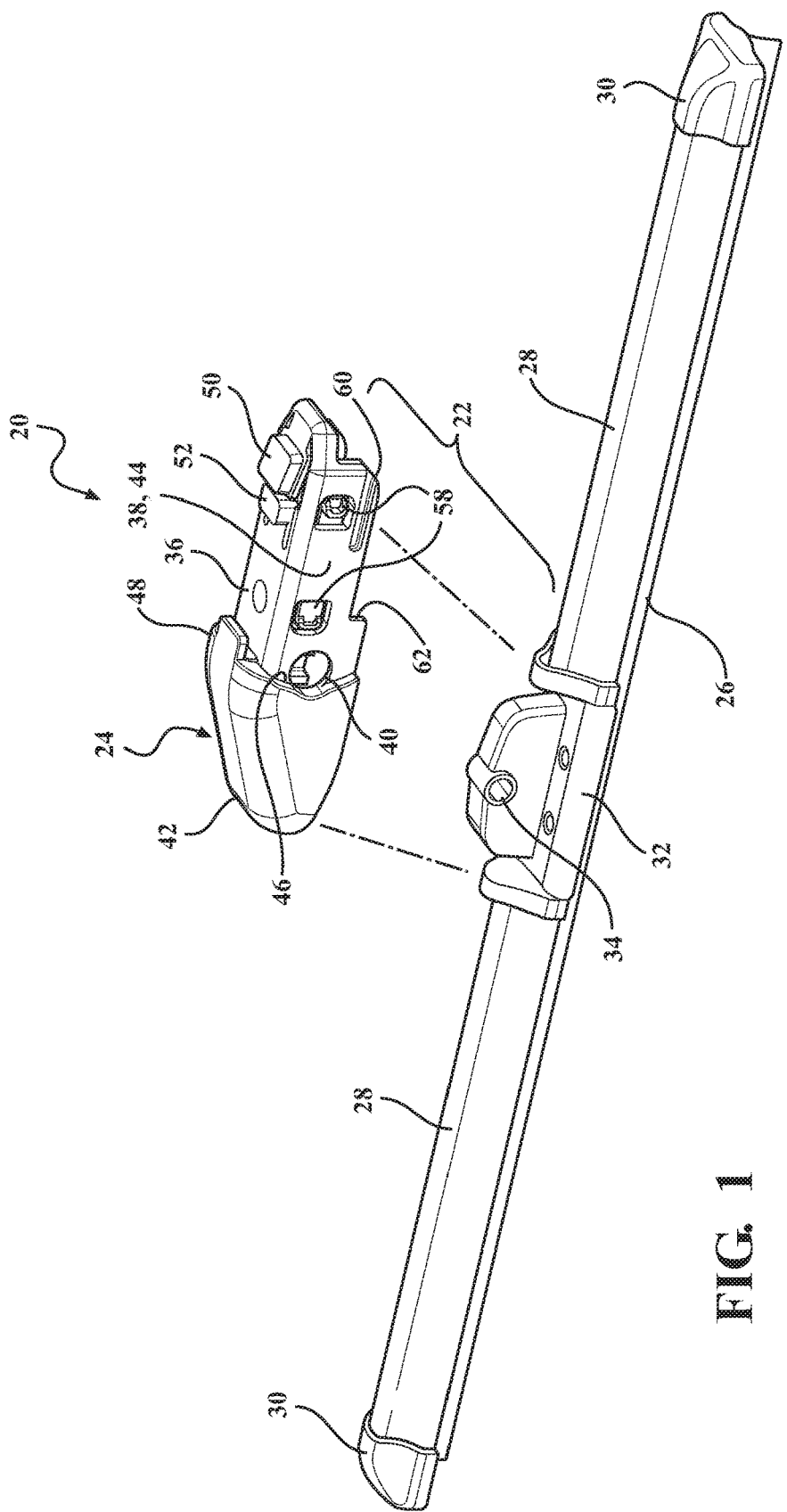
FIG. 1 is a perspective view of an exemplary embodiment of a windscreen wiper device constructed according to one aspect of the present invention.
Figure 2:
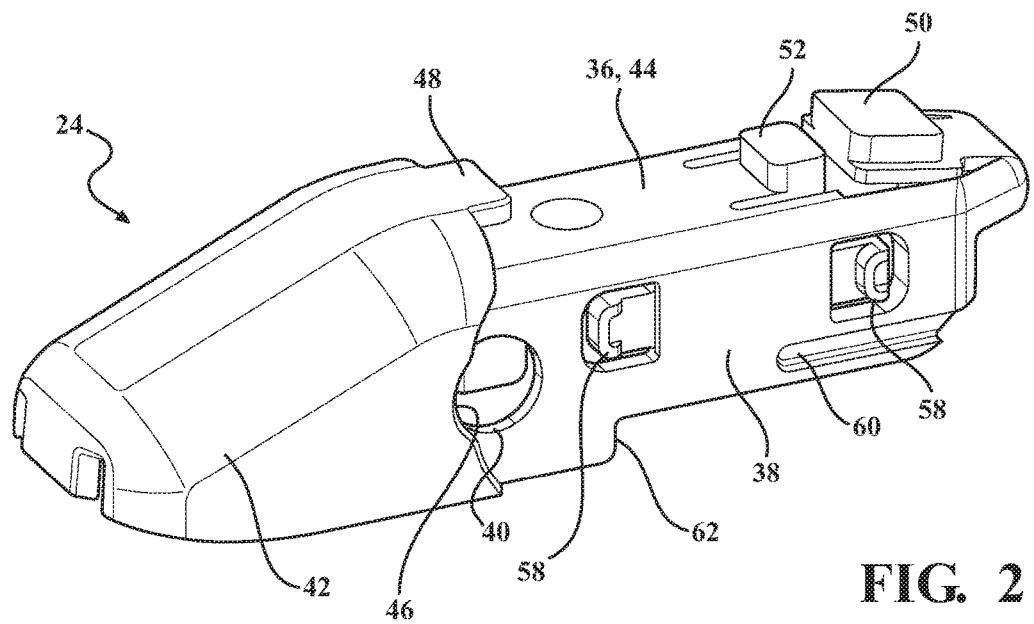
FIG. 2 is a perspective view of a joint part of the wiper device of FIG. 1.
Figure 3:
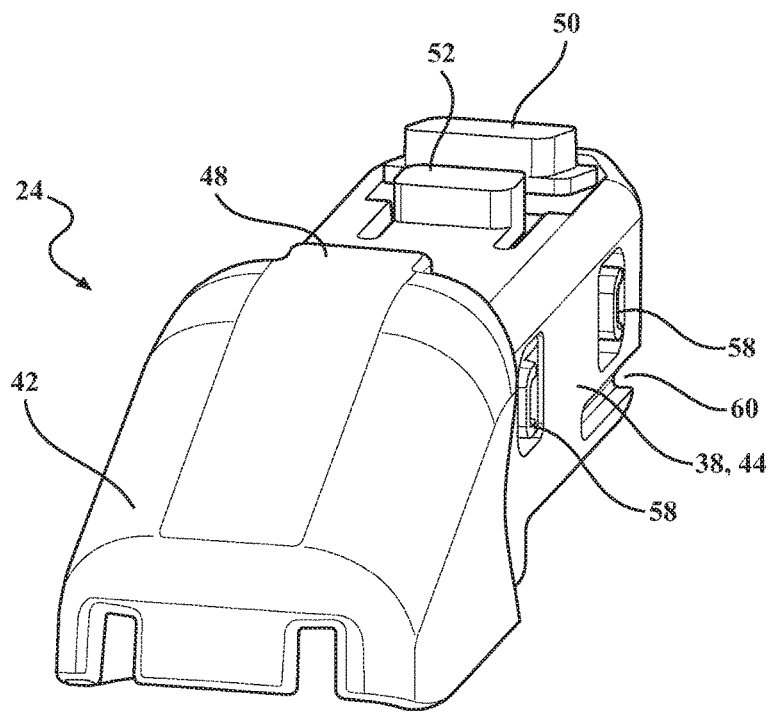
FIG. 3 is another perspective view of the joint part taken from a different perspective than FIG. 2.
Figure 4:
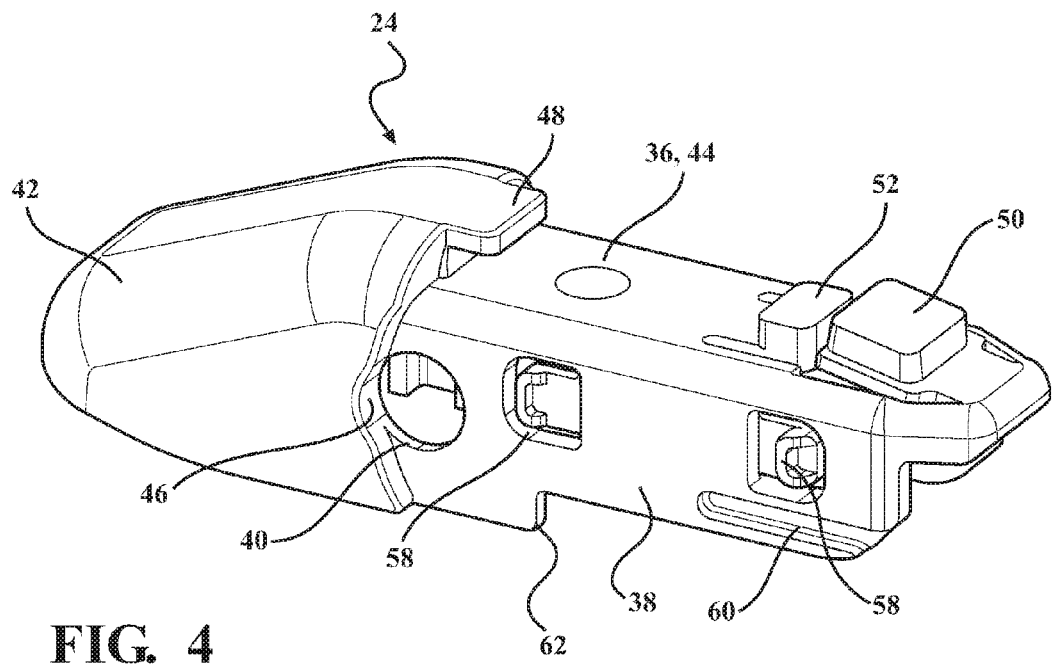
FIG. 4 is another perspective view of the joint part taken from a different perspective than FIGS. 2 and 3.
Figure 8:
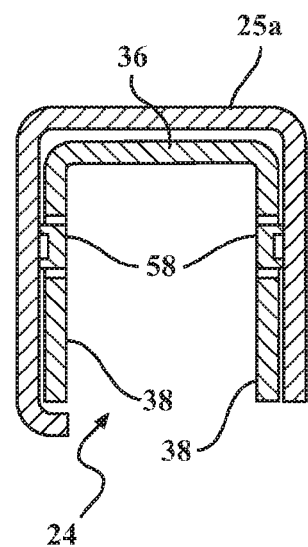
FIG. 8 is a cross-sectional view of FIG. 7 taken through Line 8-8 of FIGS. 7.
Figure 7:
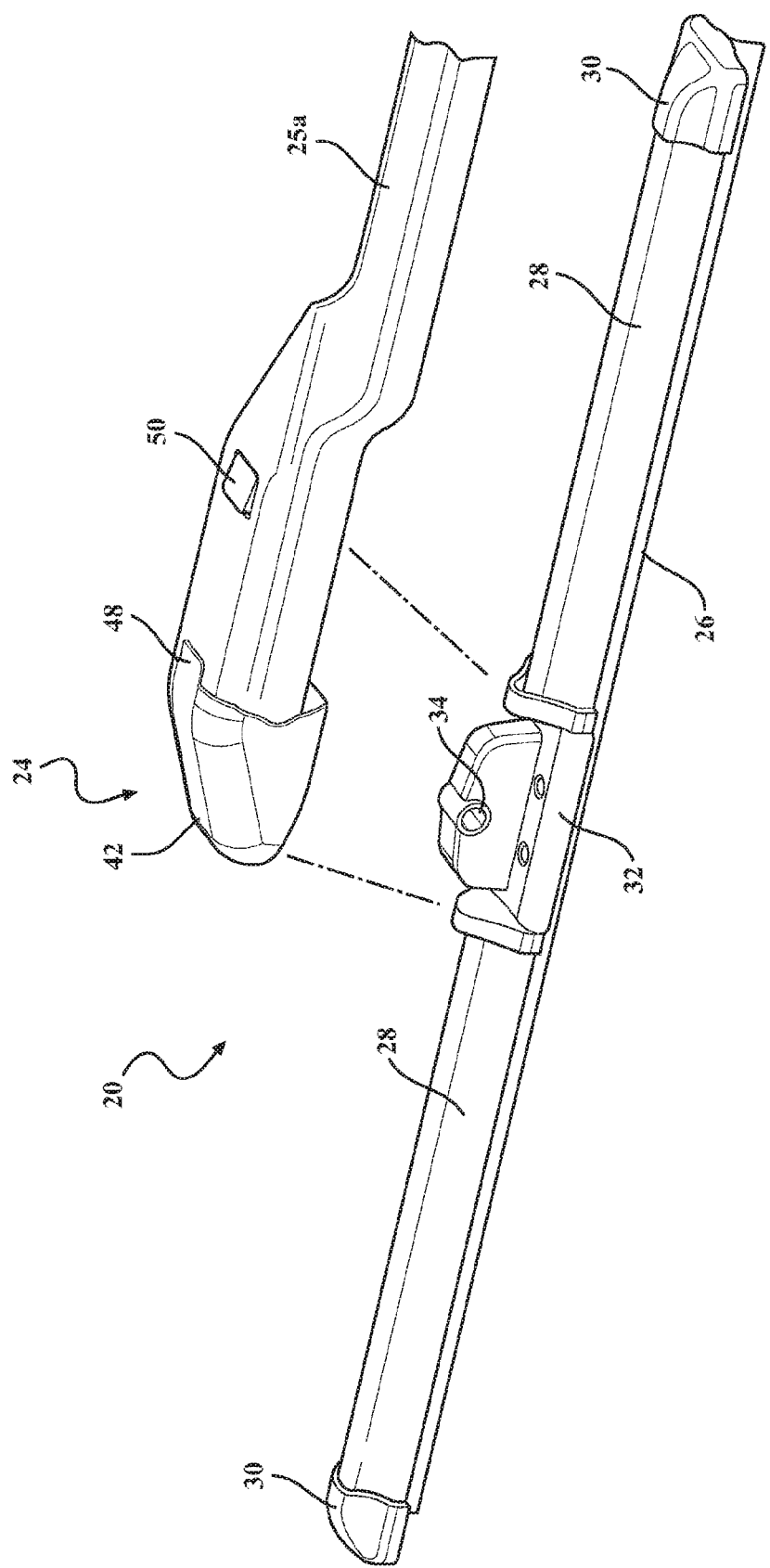
FIG. 7 is a perspective view of the joint part of FIG. 1 lockingly connected with a bayonet-style wiper arm.
Figure 9:
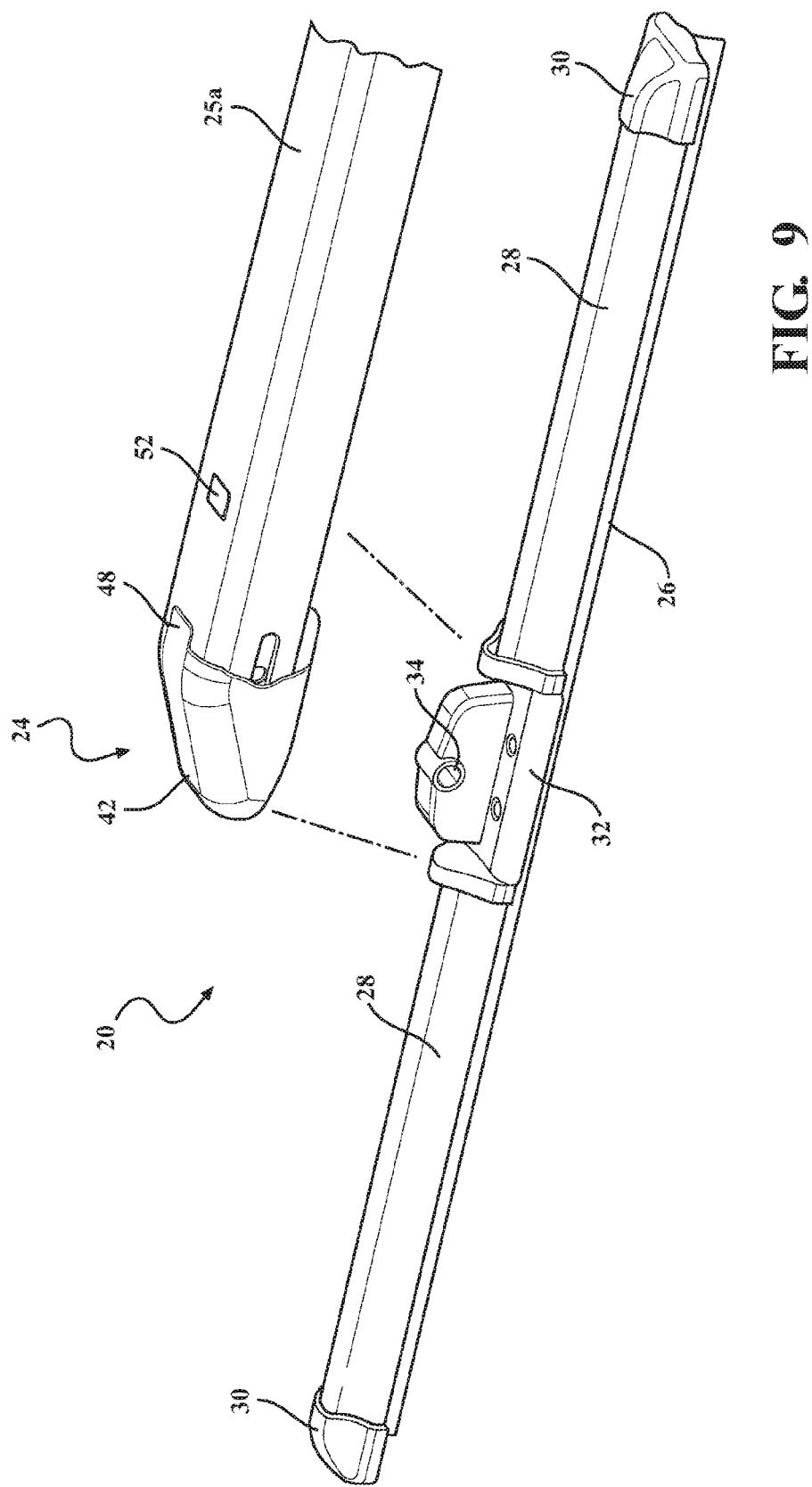
FIG. 9 is a perspective view of the joint part of FIG. 1 lockingly connected with another type of wiper arm.

Referring to the Figures, wherein like numerals indicate corresponding parts throughout the several views, a windscreen wiper device 20 with a connecting device 22 that includes an improved joint part 24, which is configured for attachment with a 19 mm bayonet-style wiper arm 25a (shown in FIGS. 7 and 8) and with a second type of wiper arm 25b (shown in FIG. 9), is generally shown in FIG. 1.

The windscreen wiper device 20 has a beam-style construction in that it includes a longitudinally extending carrier element (not shown) which is pre-curved to bias a wiper blade 26 (also known as a wiper strip or a wiper element) made of an elastomeric material, such as rubber, into a curved shape. The curved shape allows an entire length of the wiper blade 26 to seal against a curved windshield (not shown) of a vehicle as the wiper device 20 oscillates back and forth across the curved windshield. That is, in the exemplary windscreen wiper device 20, the carrier element rather than a series of yokes, distributes a force from the oscillating wiper arm 25a, 25b across the length of the wiper blade 26. The exemplary windscreen wiper device 20 also includes a pair of sub-spoilers 28, which are made as separate pieces from one another and are attached with the carrier element, for imparting a downforce on the wiper blade 26 when the vehicle is travelling at speed to improve the fluid-tight seal between the wiper blade 26 and the windshield. The connecting device 22 is engaged with the carrier element at approximately a longitudinal midpoint of the carrier element for lockingly connecting the windscreen wiper device 20 with the oscillating wiper arm. A pair of end caps 30 are engaged with opposite ends of the carrier element for retaining the sub-spoilers 28 on the carrier element between the connecting device 22 and the end caps 30. The carrier element is preferably made of spring steel and preferably includes one or more longitudinal strips that are received in opposing and laterally outwardly facing grooves of the wiper blade 26.

Referring still to FIG. 1, the connecting device 22 includes a base 32 which is fixed with the carrier element and which presents a pair of circular protrusions 34 that are co-axially aligned with one another. The joint part 24 is generally U-shaped as viewed in cross-section with a top wall 36 and a pair of side walls 38. The side walls 38 present co-axially aligned and circular openings 40 which receive the circular protrusions 34 on the base 32 to allow the joint part 24 to pivot relative to the base 32 about a pivot axis as the joint part 24 is connected with or separated from a wiper arm, such as either of the wiper arms 25a, 25b shown in FIGS. 7-9.

Referring now to FIGS. 2-9, in the exemplary embodiment, the joint part 24 presents a front nose portion 42 and a main body portion 44. The front nose portion 42 has a greater width and height than the main body portion 44 to present a U-shaped ledge 46 that faces rearwardly towards the co-axial openings 40 on the side walls 38 for contacting a front edge of the bayonet-style wiper arm 25a when connected therewith. The front nose portion 42 also presents a tab 48 which is spaced above the top wall 36 of the main body portion 44 and overlies a top surface of the bayonet-style wiper arm 25a to retain the joint part 24 with the wiper arm 25b. The joint part 24 is preferably made as a single, integral piece of injection molded plastic.

Adjacent a longitudinal back end of the main body portion 44, the top wall 36 includes a pair of a resilient, or spring-loaded, tongues 50, 52 including a first tongue 50 that extends forwardly, towards the pivot axis, and a second tongue 52 that extends rearwardly, away from the pivot axis. Each of the tongues 50, 52 includes a button which projects vertically upwardly for engaging in an opening in a top surface of a wiper arm to lock the joint part 24 with the wiper arm. For example, one of the buttons is shown in engagement with the bayonet-style wiper arm 25a in FIG. 7, and the other button is shown in engagement with the other style of wiper arm 25b in FIG. 9. The resilient tongues 50, 52 are cantilever beam-shaped, which provides the spring force to allow the buttons to spring into engagement with the wiper arms and to allow the buttons to be depressed to allow the joint part 24 to be detached from the wiper arms 25a, 25b. The first resilient tongue 50 is angled upwardly to allow the button to be automatically depressed as both the bayonet-style and other-style of wiper arms are being attached thereto.

Each of the side walls 38 also has a pair of interference fingers 58 which are integrally connected with the side walls 38 and have projections that project laterally outwardly therefrom. The interference fingers 58, similar to the resilient tongues 50, 52, also are spring loaded by living hinges. When the joint part 24 is attached with either the bayonet-style of wiper arm or the other style of wiper arm, the interference fingers 58 press against inner surfaces of the wiper arms to reduce side-to-side play, or slop, between the joint part 24 and the respective wiper arm. That is, the interference fingers 58 improve the attachment between the joint part 24 and the wiper arm 25a, 25b. The two interference fingers 28 on each side wall 38 extend longitudinally in opposite directions, and each interference finger 58 includes a U-shaped projection which projects from a flat surface that is recessed relative to surrounding portions of the respective side wall 38. Each of the U-shaped projections has a pair of legs which face rearwardly and which are ramped, or curved, thereby allowing the respective U-shaped projection to automatically deflect inwardly as the joint part is slid into contact with the bayonet-style wiper arm.

Each of the side walls 38 also presents a groove 60, or slot, which extends from the longitudinal back end of the respective side wall 38 forwardly and terminates in a location between the two interference fingers 58. When connecting the joint part 24 with one style of wiper arm 25b, dimples or bumps (not shown) in the wiper arm 25b are received in these grooves 60 to guide the attachment process.

Additionally, a lower edge of each of the side walls 38 of the main body portion 44 presents a stop face 62 that faces away from the pivot axis. When the joint part 24 is attached with a bayonet-style wiper arm 25a, a flange (not shown) on the wiper arm 25a wraps underneath the lower edges of the side walls 38 which guide the installation until the flanges hit the stop faces 62.

Figure 5:
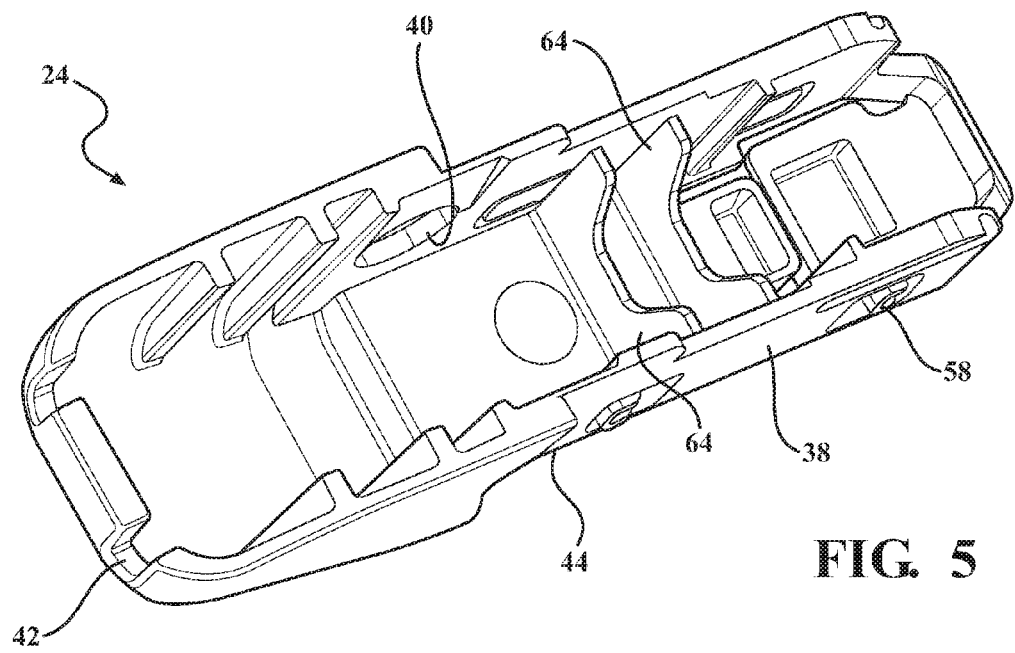
FIG. 5 is another perspective view of the joint part taken from a different perspective than FIGS. 2-4.
Figure 6:
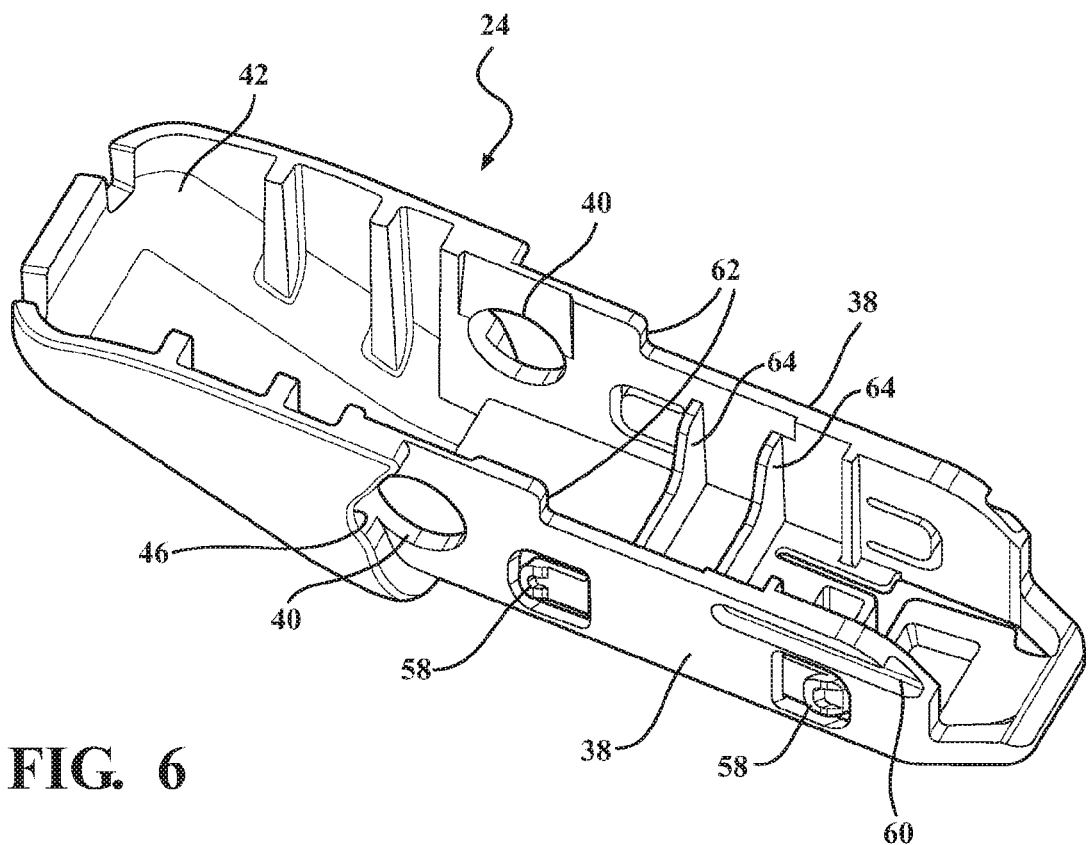
FIG. 6 is another perspective view of the joint part taken from a different perspective than FIGS. 2-5.

As shown in FIGS. 5 and 6, an interior of the joint part 24 is provided with a plurality of ribs 64 and support features for reinforcing the side walls 38, thereby allowing the side walls 38 to have a reduced thickness without compromising structural integrity.

Obviously, many modifications and variations of the present invention are possible in light of the above teachings. It is, therefore, to be understood that within the scope of the appended claims, the invention may be practiced otherwise than specifically described. It should also be appreciated that the directional terms used herein are in reference to the enabling embodiment in one particular orientation and are not meant to require any certain orientation. Additionally, it is to be understood that all features of all claims and all embodiments can be combined with each other, as long as they do not contradict each other.

What is claimed is:

1. A windscreen wiper device, comprising:
a wiper blade made of an elastomeric material and extending in a longitudinal direction;
a joint part with a U-shaped cross-section including a top wall and a pair of side walls; and
each of said side walls having a pair of spring loaded interference fingers which project outwardly for engaging an inner surface of a wiper arm to reduce side to side play between said joint part and the wiper arm and which extend in opposite longitudinal directions.

2. The windscreen wiper device as set forth in claim 1 wherein said at least one spring loaded interference finger has a longitudinally facing ramped surface for automatically deflecting as said joint part is attached with a wiper arm.

3. The windscreen wiper device as set forth in claim 1 wherein each of said side walls has a pair of spring loaded interference fingers.

4. The windscreen wiper device as set forth in claim 3 wherein each spring loaded interference finger has a generally U-shaped projection.

5. The windscreen wiper device as set forth in claim 4 wherein each generally U-shaped projection has a pair of legs with ramped surfaces for automatically deflecting said spring loaded finger as said joint part is attached with a wiper arm.

6. The windscreen wiper device as set forth in claim 4 wherein each of said spring loaded interference fingers is surrounded by a U-shaped opening in an associated one of said side walls and each of said spring loaded interference fingers has a flat surface which is recessed relative to surrounding portions of said side wall.

7. The windscreen wiper device as set forth in claim 1 wherein said joint part includes a front nose portion and a main body portion and wherein said front nose portion has a greater width and a greater height than said main body portion to present a U-shaped ledge that faces rearwardly.

8. The windscreen wiper device as set forth in claim 7 wherein said top wall of said main body portion has at least one spring loaded tongue for engaging in an opening in a wiper arm.

9. The windscreen wiper device as set forth in claim 8 wherein said top wall of said main body portion has a pair of spring loaded tongues for engaging in the openings of different types of wiper arms.

10. The windscreen wiper device as set forth in claim 7 wherein at least one of said side walls of said main body portion has a groove which opens to a longitudinal end of said main body portion.

11. The windscreen wiper device as set forth in claim 1, wherein said wiper blade is biased into a curved shape when in a resting condition.

12. The windscreen wiper device as set forth in claim 11 further including a base that has a pair of laterally outwardly extending protrusions and wherein said side walls of said joint part have circular openings for allowing said joint part to pivot relative to said base about a pivot axis.

13. A windscreen wiper device, comprising:
a wiper blade made of an elastomeric material and extending in a longitudinal direction;
a joint part with a U-shaped cross-section including a top wall and a pair of side walls;
at least one of said side walls having a spring loaded interference finger projecting outwardly for engaging an inner surface of a wiper arm to reduce side to side play between said joint part and the wiper arm;
said joint part including a front nose portion and a main body portion and wherein said front nose portion has a greater width and a greater height than said main body portion to present a U-shaped ledge that faces rearwardly;
said top wall of said main body portion having a pair of spring loaded tongues for engaging in the opening of different types of wiper arms; and
wherein said spring loaded tongues in said top wall of said main body portion extend in opposite longitudinal directions.

* * * * *